May 22, 1923.
A. BARR ET AL
1,455,772
OPTICAL APPARATUS FOR MEASURING SMALL ANGLES
Filed May 24, 1921
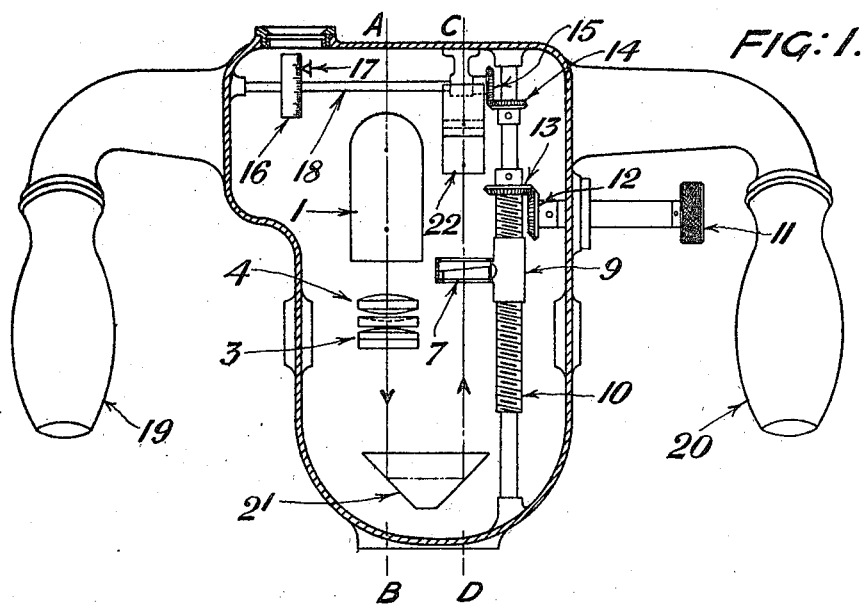
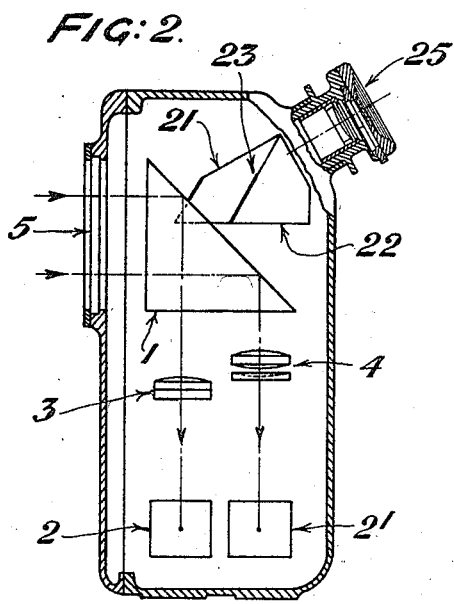
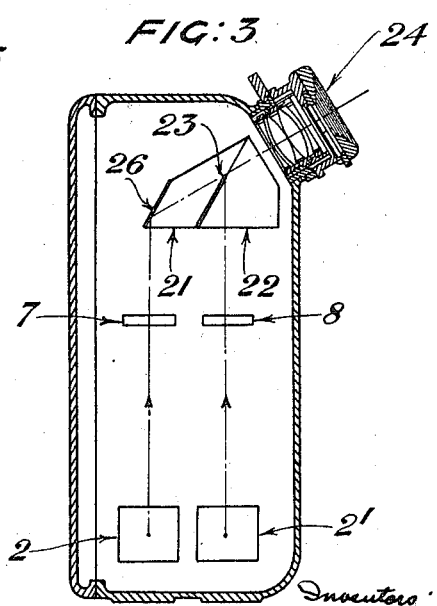
Inventors:
Archibald Barr
William Stroud
By J. Walter Fowler, Jr.
Attorney.

Patented May 22, 1923.

1,455,772

UNITED STATES PATENT OFFICE.

ARCHIBALD BARR AND WILLIAM STROUD, OF GLASGOW, SCOTLAND, ASSIGNORS TO BARR AND STROUD, LIMITED, OF GLASGOW, SCOTLAND.

OPTICAL APPARATUS FOR MEASURING SMALL ANGLES.

Application filed May 24, 1921. Serial No. 472,188.

*To all whom it may concern:*

Be it known that we, ARCHIBALD BARR and WILLIAM STROUD, subjects of the King of Great Britain and Ireland, and both of Caxton Street, Anniesland, Glasgow, Scotland, have invented new and useful Improvements in Optical Apparatus for Measuring Small Angles, of which the following is a specification:—

The object of our invention is to provide improved optical means of measuring small angles, especially in a horizontal plane. The present invention is specially applicable to the determination of the angle subtended by the length L of an enemy ship (or the distance between two prominent marks such as two masts). When L is known and the range has been determined, this angular measurement furnishes means for the calculation of the course of the enemy and more especially furnishes means for the rapid detection of a change of course on the part of the enemy.

With this object in view we provide a double telescopic system having a common eyepiece in which the two fields are separated and so presented as to enable observations to be made on the coincidence principle of rangefinding, such separation being in or near the focal plane of the eyepiece. For example, an upper field is furnished by one telescope and a lower field by the other. In order to secure compactness and handiness the telescopic system we adopt is of the prismatic type; and each beam of light may be first reflected vertically, say, downwards, then horizontally and perpendicularly or laterally to the vertical plane including the line of sight, then vertically, in this case upwards, and finally reflected either horizontally parallel to the line of sight or suitably inclined so that the observer looks down at an angle of say 45° or 60° to see the images.

The prism system of each telescope may, for example, consist of three prisms (1) a simple reflecting prism for throwing the light downwards (2) a doubly reflecting prism for throwing the light upwards involving twofold reflection and (3) one or other part of a separating prism system. In cases where the first vertical reflections are made by separate prisms these may be mounted on a single carrier so that they will partake equally of any disturbing motion which may occur, or these reflections may be obtained by using a single prism common to both telescopes. In constructional arrangement one telescope may conveniently be situated in front of the other, i. e., further from the observer than the other.

The separating prism system may consist of two prisms of suitable form cemented together, one of the prisms, which is situated nearer the eyepiece than the other, being silvered on the back over the upper or lower half with a clear separating line or edge between the two halves. This prism is arranged in such a position that the focal plane of the nearer telescope is coincident with this dividing or separating line, while the second prism cemented to the partly silvered back of the first forms the final reflecting surface for the more distant telescope; thus this reflecting surface has to be parallel to the partly silvered face of the first prism. The disposition of the optical parts is such that the focal plane of the more distant telescope contains the separating line.

In order to measure the minute angle with sufficient accuracy, we provide a refracting prism or prism system in one of the telescopes, or two such prisms or prism systems, one in each telescope. For example, translatable prisms may be provided and each prism may be arranged to travel, say between the doubly reflecting prism and the separating prism, or between the doubly reflecting prism and the objective, or, when two refracting prisms are used one may travel in the one region and one in the other. When two translatable refracting prisms are used they must travel in opposite directions if similarly disposed (i. e. if their refracting edges parallel to one another are both on the same side) but in the same direction (i. e. they may be held in the same mount and may be translated together) if oppositely disposed. In the latter case further provision may be made for the measurement of zero angle and for the accurate setting of the zero position because the two prisms can never be brought to within some little distance of the separating line. With this object in view we may make the two doubly reflecting prisms (2) for the two telescopes of slightly differing angles so as to give the zero position when the carrier of the two refracting prisms is suitably placed.

In order to read the minute angle with rapidity and ease, we may gear up to a working head (associated with gear which is provided for operating the refracting prism or prisms) an indicating device.

Where the instrument is to be held in the hand we may provide two handles and so arrange the working head that it is conveniently operated by the fingers of one hand while grasping a handle.

For use on board ship in cases where the instrument is supported on a stand a gimbal ring may be provided to carry the instrument so that the hands may conveniently control the line of sight of the instrument notwithstanding the pitching or rolling of the ship.

An example of construction will now be described with reference to the accompanying drawing, in which:—

Figure 1 is a vertical sectional elevation at right angles to the line of sight.

Figure 2 is a vertical section for the most part through the line AB of Figure 1.

Figure 3 is a vertical section through the line CD of Figure 1.

In the figures the horizontal beams of light after traversing the window 5 are reflected downwards by prism 1. In this case a single prism 1 is used for the first reflection of the two beams. This, as explained, has the advantage that any small motion of this prism affects the two beams equally and therefore does not produce any relative motion of the two partial images below referred to. The upper beam then passes through objective 3, while the lower passes through objective 4 (the two lenses of which are shown as being capable of adjustment by separation so as to secure equal magnification in the two telescopes). The beams are next doubly reflected by the prisms 2 and $2^1$ respectively, so that they proceed upwards (Figures 1 and 3) and then traverse respectively the refracting prisms 7 and 8. These prisms may be mounted together in a holder carried by nut 9 upon a screw 10 operated by a working head 11 through the bevel wheels 12 and 13. Upon the shaft of screw 10 is fixed bevel 14 gearing with bevel 15 fixed to shaft 18 upon which is fixed drum 16 movable with reference to a fixed pointer 17 so that the reading of the angle to be measured can be done by the left eye by means of an eyepiece 25, Figure 2. In Figure 2 the left eyepiece 25 is shown in section but it is not in the same plane as the prisms 21 and 22. The case is therefore shown broken in the region of the eyepiece 25.

It will be obvious that, instead of the graduated drum 16 we may use any known system of counter drums or other arrangement for indicating rotations and partial rotations of the screw 10.

The beams of light after traversing the refracting prisms 7 and 8 respectively enter the prisms 21 and 22 respectively. The prism 22 may be coated with silver over a portion of its surface (say the lower part) terminating in a cleanly cut edge at 23. The optical parts are so arranged that images of the object are formed by the two telescopes in the plane of the edge of the silvering. Of the image formed by the telescope system 4, $2^1$, 8, only that part which falls below the separating edge 23 will be reflected so as to be seen through the eyepiece 24, and of the image formed by the telescope system 3, 2, 7, only that portion which falls above the separating edge will be seen through the eyepiece 24. In the field of view of the eyepiece will thus be seen two partial images of the object viewed, the edge 23 of the silvering forming a separating line between the partial images in the manner similar to that in use in coincidence range-finders. The upper part of the prism 22 could evidently be silvered instead of the lower part. Instead of silvering one half (more or less) of the prism 22, a narrow horizontal strip of silvering may be formed at 23 on the back of the prism 22 and the images of the object viewed, formed by the two telescope systems, may be focussed accurately in the plane of one of the edges of the strip, but if the strip is narrow both edges may be virtually in the focal plane of the images. The beam passing through prism 8 is reflected from the strip, while the beam passing through 7 is reflected from the face 26 of prism 21 and, after passing above and below the strip 23, enters the eyepiece 24. In the field of view of the eyepiece 24 we thus have an inset field formed by the telescope 4, $2^1$, 8, extending across or surrounded by a field formed by the telescope 3, 2, 7.

Instead of providing a narrow strip of silver on the back of the prism 22 we may silver the whole of the back of prism 22 except a narrow band of clear glass at 23 in which case we again have one partial image formed by one of the telescope systems (in this case 3, 2, 7) inserted in a field produced by the other telescope system (in this case 4, $2^1$, 8).

The use of such a strip field is also already known in connection with coincidence range-finders.

Other arrangements of eyepiece prisms than those described may be used, retaining the characteristic features of the present invention.

In the operation of the instrument the working head 11 is rotated until the two images of one end of the length L as given by one of the telescope systems is seen in coincidence with the image of the other end of the length L as formed by the other telescope system, when the scale, if properly graduated, will indicate the angle subtended at the instrument by the length L in any chosen unit, for example in minutes of angle or as a ratio of the length L to the distance from the instrument of the object furnishing the length L.

For the accurate setting of the zero position the two prisms 2 and $2^1$ may be of slightly differing angles, because the refracting prisms 7 and 8 can not be brought in the plane containing the separating line 23.

Suitable means, such as those well known in connection with coincidence rangefinders, may be provided in the instrument for effecting adjustments corresponding to those of "halving" and "coincidence" provided for in well known forms of coincidence rangefinders.

If the instrument is to be held in the hands, downwardly extending handles such as are shown at 19 and 20 in Figure 1 may be provided, the right hand grasping the handle 20 being in convenient proximity to the head 11 which may be operated, say, by the forefinger and thumb.

We claim:—

1. Optical apparatus consisting of two telescopic systems of the prismatic type, an eyepiece common to the two telescopic systems, each telescopic system having prisms for reflecting the beams of light first vertically in one direction then horizontally and laterally, then vertically, in a direction opposite to the first, a separating prism system by which the beams are directed into the eyepiece, and means in the telescopic systems for producing coincidence, for the purposes set forth.

2. Optical apparatus consisting of two telescopic systems of the prismatic type, an eyepiece common to the two telescopic systems, a single prism common to the two telescopes for reflections, first vertically in one direction and each telescopic system having prisms for reflections, horizontally and laterally, then vertically in a direction opposite to the first, a separating prism system by which the beams are directed into the eyepiece, and means in the telescopic systems for producing coincidence, for the purposes set forth.

3. Optical apparatus consisting of two telescopic systems of the prismatic type, an eyepiece common to the two telescopic systems, each telescopic system having prisms for reflecting the beams of light first vertically in one direction then horizontally and laterally, then vertically in a direction opposite to the first, a separating prism system by which the beams are directed into the eyepiece consisting of two prisms arranged opposite the eyepiece having a separating line situated in the focal plane common to the telescopic systems, and means in the telescopic systems for producing coincidence, for the purposes set forth.

4. Optical apparatus consisting of two telescopic systems of the prismatic type, an eyepiece common to the two telescopic systems, each telescopic system having prisms for reflecting the beams of light first vertically in one direction then horizontally and laterally, then vertically in a direction opposite to the first, a separating prism system by which the beams are directed into the eyepiece, and a translatable refracting prism in one of the telescopes for producing coincidence, for the purposes set forth.

5. Optical apparatus consisting of two telescopic systems of the prismatic type, an eyepiece common to the two telescopic systems, a single prism common to both telescopes for reflecting the beams of light first vertically in one direction, doubly reflecting prisms, one in each telescope, for reflecting the beams, then horizontally and laterally, then vertically in a direction opposite to the first, a separating prism system by which the beams are directed into the eyepiece, and means in the telescopic systems for producing coincidence, for the purposes set forth.

6. Optical apparatus consisting of two telescopic systems of the prismatic type, an eyepiece common to the two telescopic systems, a single prism common to both telescopes for reflecting the beams of light first vertically in one direction, doubly reflecting prisms of slightly differing angles, one in each telescope, for reflecting the beams, then horizontally and laterally, then vertically in a direction opposite to the first, a separating prism system by which the beams are directed into the eyepiece, and means in the telescopic systems for producing coincidence, for the purposes set forth.

7. Optical apparatus consisting of two telescopic systems of the prismatic type, an eyepiece common to both telescopic systems, each telescopic system having prisms for reflecting the beams of light first vertically downwards then horizontally and laterally, then vertically upwards, a separating prism system by which the beams are directed into the eyepiece, means in the telescopic systems for producing coincidence and an auxiliary eyepiece for viewing indications, for the purposes set forth.

8. Optical apparatus consisting of two telescopic systems of the prismatic type, an eyepiece common to the two telescopic systems, each telescopic system having prisms for reflecting the beams of light first vertically downwards, then horizontally and laterally, then vertically upwards, a separating prism system by which the beams are directed into the eyepiece, means in the telescopic systems for producing coincidence, two downwardly extending handles one at each side of the apparatus and a working head for operating the means provided for producing coincidence, for the purposes set forth.

ARCHIBALD BARR.
WILLIAM STROUD.